Patented June 9, 1953

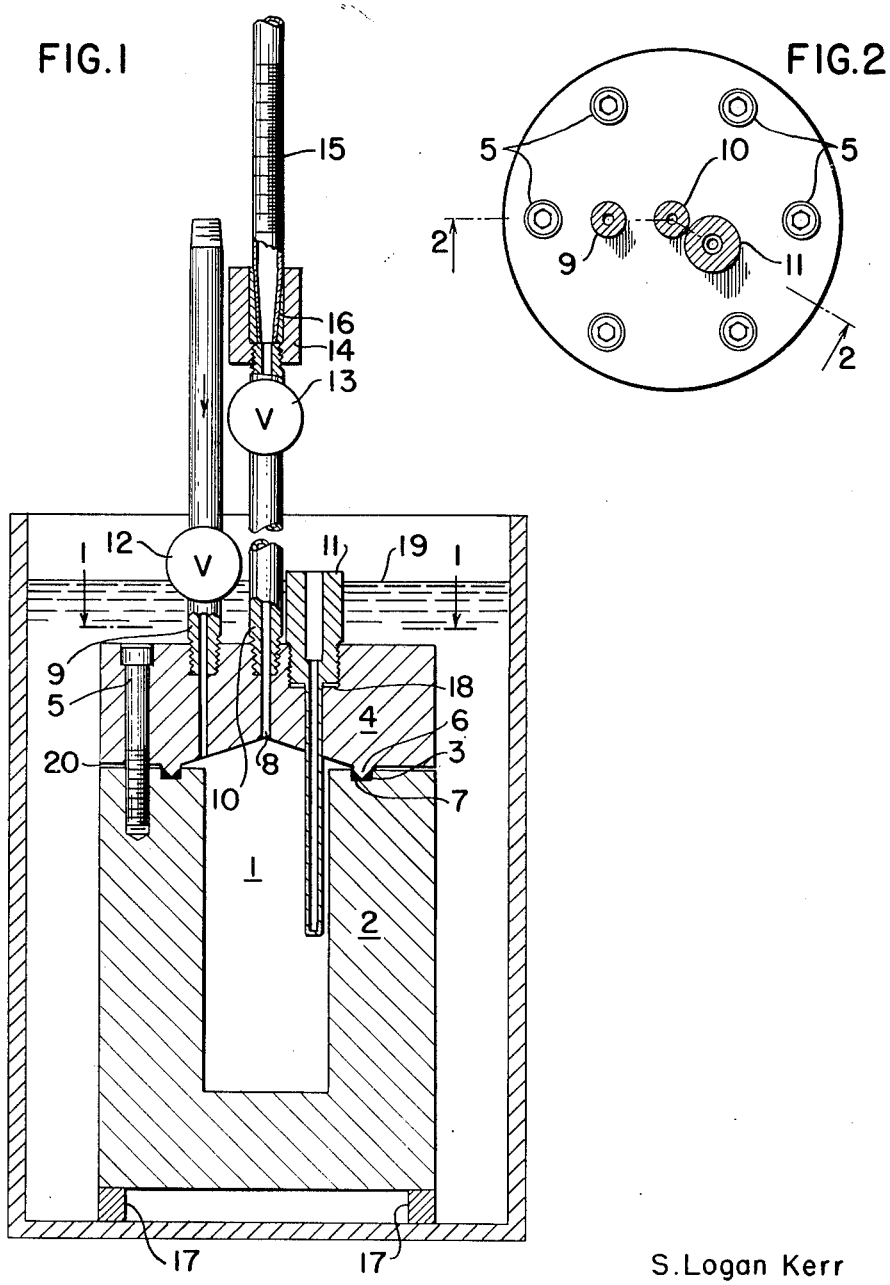

2,641,127

UNITED STATES PATENT OFFICE 2,641,127

APPARATUS FOR THE MEASUREMENT OF THE BULK MODULUS OF LIQUIDS

Samuel Logan Kerr, Philadelphia, Pa., and Lewis H. Kessler, Evanston, Ill.

Application April 15, 1950, Serial No. 156,108

4 Claims. (Cl. 73—53)

Our invention relates to apparatus for the measurement of the bulk modulus of liquids. The apparatus of our invention is particularly useful in the measurement of the bulk modulus of crude oil and liquid petroleum products and is described and illustrated with respect to such liquids.

In the attempt to decrease the initial cost of pipe line installations for the transportation of crude oils and liquid petroleum products, safety factors in pipe line design have been drastically reduced. In some instances these safety factors have been reduced from about 5 or 6 to as little as 1.6. As a result of the reduction in the design safety factors, serious failures of pipe lines in the form of leaks and breaks have been encountered. These failures are largely the result of pressure waves or surges that develop in the lines. Because of the use of assumed bulk moduli for the crude oils being transported, it has not been possible to determine accurately the extent of these surges and, therefore, the necessary pipe design to withstand the pressures resulting from such surges. Heretofore, the use of high safety factors made an accurate determination unnecessary. At present, however, the use of low safety factors makes it imperative to determine the exact conditions which prevail so that failures can be avoided.

We have devised apparatus by which the bulk modulus of any particular crude oil, liquid petroleum product or any other liquid can be determined simply and accurately.

In accordance with our invention, a sample of the liquid for which the bulk modulus is to be determined is confined in a chamber of known volume. The sample is subjected to desired pressure and temperature conditions. The pressure is then released and the liquid is allowed to expand into a measuring vessel open to the atmosphere. In this manner the net change in volume of the liquid, and consequently its bulk modulus, is determined at the pressure and temperature conditions of the test. No pressure equalization devices are used or required.

For a more complete understanding of our invention the following description is given with reference to the accompanying drawing in which:

Fig. 1 is a view in side elevation of a suitable embodiment of our apparatus partly in section along line 2—2 of Fig. 2; and Fig. 2 is a top view partly in section along line 1—1 of Fig. 1.

The illustrated device has a chamber 1 in which the liquid to be tested is confined. The chamber is formed by a base 2 and a cap 4. The base 2 contains a basin which forms the largest portion of the chamber. The upper annular surface of the base 2 is provided with a sealing groove 3. The chamber 1 is completed by the cap 4 which is attached to the base 2 over the basin. The cap 4 may be attached to the base 2 by any suitable means so long as the union will withstand the pressures applied. We have found that a satisfactory fastening may be made by means of bolts 5. When bolts are used to secure the cap 4 to the base 2, the cap and base are marked so that the cap is always placed on the base in the same position to insure the positioning of the bolts in the same tapped holes. The bottom surface of the cap 4 is provided with a V-shaped sealing ring 6 which is positioned to mate with the sealing groove 3 to form a seal for the apparatus. The actual seal is accomplished by placing hard lead solder 7, or a similar substance, in the sealing groove 3 so that the V-shaped sealing ring 6 is forced into the solder 7 when the cap 4 is fastened in place. The V-shaped sealing ring 6 should not contact the sides of the sealing groove 3. The cap 4 is tapered upward from the sealing ring 6 to the chamber outlet 8 for the ready discharge of gas from the chamber when the gas is displaced by incoming liquid. The cap is provided with an inlet line connecting with a hole through the cap leading into the chamber for incoming liquid as at 9, an outlet line connecting with a hole through the cap leading out of the chamber for outgoing or discharge liquid as at 10 and an enclosed thermometer well 11. These are all fastened to the cap with threaded connecting pieces in order to withstand the pressures to which the device is subjected. The liquid lines 9 and 10 are provided with valves 12 and 13, respectively. The valves 12 and 13 may be of any suitable type that will withstand the pressures applied during the testing operations. We have found that Hoke steel valves, needle type, are satisfactory for use with our device. The incoming liquid line 9 is connected with a source of the liquid to be tested. The liquid sample is supplied to line 9 under controlled pressure so that the test pressure can be regulated. A dead weight tester can be used with advantage for this pressure supply. The outgoing or discharge line 10 originates at chamber outlet 8, passes through valve 13 and terminates in an adapter 14. The adapter 14 is provided with a hole 16 which is ground to a taper to fit the ground glass taper of a calibrated burette or pipette 15.

The thermometer well 11 extends into the center of the chamber 1. The thermometer well insert is so sized that it is press fitted into the drilled opening of the cap 4. A copper gasket 18 is provided at the bottom of the threaded portion of the well 11. When the thermometer well is in place, no air or liquid in the test chamber can surround that portion of the thermometer well 11 within the cap 4. Temperature measurements can be made conveniently with a thermocouple of the iron to constantan type, or may be made by other conventional means.

The test device and connecting lines are constructed of mild steel, or other suitable material, to withstand the test pressures. The drawing is approximately to scale and shows the relative proportions of the test device. The wall thickness of the base and the size and number of fasteners provided to secure the cap to the base are more than adequate to withstand the test pressures which will be employed. We performed tests on the apparatus to determine the effectiveness of the seal and the change in volume of the device with pressure. At 2,000 p. s. i. the seal was effective and the change in volume of the chamber so slight that no correction is necessary.

The base 2 of the body of the device may with advantage be provided with legs as at 17 to allow circulation under the base of the test device of a liquid medium of a constant temperature bath, in which the device is placed during test operations, for faster and more accurate temperature adjustment.

The temperature control bath can be a water bath in a suitable tank with inlet and drains positioned to maintain the bath level, as shown at 19, at a point below the top of the thermometer well 11. The portion of the oil sample confined within the test device above the bath level 19, i. e., in the discharge line 10 up to the valve 13, is of very small volume. While the temperature of this small portion may not be exactly that of the test chamber, this portion reaches substantially the same temperature by heat transfer within the liquid oil under test. A constant temperature of the bath can be maintained by customary means. For example, an electrically heated immersion unit with a thermal regulator for automatic temperature control may be used. When tests are made at 32° F., ice is used and no automatic controls are necessary. The small gap 20 in the test device between the cap 4 and the base 2 apparently aids in the equalization of bath and test sample temperatures.

The following example is given to illustrate operation of the test device for the determination of the bulk modulus of a sample of crude oil. Prior to the test of any liquid samples, the volume of the chamber and connections from the inlet valve 12 to the discharge valve 13 is determined. This can be done advantageously with mercury for the reason that the mercury does not wet the metal surfaces of the chamber or the connections.

The test device is cleaned, for example, by washing with Alconox and boiling water, dried and washed with carbon tetrachloride and air dried. The cap 4 is put in place, bolted down and the seal accomplished as described above. The test device is placed in the tank containing the temperature control bath and the pressure supply of the oil to be tested is connected to the inlet line 9.

With the inlet valve 12 and the discharge valve 13 open, the chamber 1 and pipe connections are filled with the liquid oil to be tested. When a dead weight tester is used to supply the desired pressure, the dead weight tester, tester reservoir and Bourdon gauge connections are also filled with the oil to be tested. A small amount of pressure is developed on the oil supply, and the oil is forced through the test device and connections until no air remains entrapped within the system. During this operation, a temporary connection to the adapter may be provided to carry away the overflowing oil so that the oil does not spill over the test device. Alternatively, a bleeder line with a bleeder valve may be connected between the valve 13 and the adapter 14 in line 10 to carry off overflowing oil. In this latter case, the bleeder valve will be open during this filling step and closed for the remainder of the test. The pressure is then released so that oil recedes from the adapter 14. The measuring burette 15 is not yet in place. Discharge valve 13 is then closed, and the temperature of the oil sample in the device is allowed to assume the temperature of the water bath with the automatic temperature control of the bath set at the desired temperature. The temperature of the oil sample is determined by means of the thermocouple, or other temperature measuring means, in the thermometer well. When the test temperature has been attained, a small amount of pressure is again placed on the oil sample. Valve 13 is opened and oil is permitted to rise up into the adapter 14. Valve 13 is again closed. The measuring burette 15, after having been cleaned and dried, e. g. washed with hot Alconox and water, rinsed with distilled water and air dried with compressed air, is slowly inserted into the adapter displacing oil from the adapter into the burette. In order to provide a seal between the ground glass taper of the burette and the adapter, lubri-seal stopcock grease is applied to the ground glass taper of the burette and the taper is flamed slightly, just before the burette is inserted into the adapter, to melt the grease uniformly. This produces a seal which will be sufficient to withstand the maximum pressure developed at this point, i. e., the pressure developed by an oil column equal to the height of the burette. With the burette in place, valve 13 is reopened to allow oil to rise into the burette for a zero reading. Valve 13 is then closed tightly. With valve 13 closed, pressure is developed until the desired unit pressure is reached. For example, when using a dead weight tester, weights are loaded on the piston of the tester, the tester adjusted so that the weight pan is supported by the oil above the pan rest and the pan spun so that any friction error is substantially eliminated.

When the desired unit pressure is established by the pressure supply, the pressure in the test chamber is equal to the pressure supply except for the pressure of the liquid oil head represented by the vertical length of inlet pipe 9 leading to the device from the pressure supply. This liquid head ordinarily will not represent sufficient pressure to warrant any correction but correction can be made if necessary. The inlet valve 12 is closed slowly. It is important that this closure be made slowly so that the equalization of pressure between the test chamber and supply source is not affected. Inlet valve 12 and discharge valve 13 are then tightened.

The test chamber temperature and the zero reading of the measuring burette are read and recorded.

Valve 13 is then opened slowly, permitting the oil under pressure in the test chamber to expand and rise into the measuring burette which is open to the atmosphere. When the level in the burette reaches the maximum height, the valve 13 is closed. The oil level in the burette will rise slightly as the valve closure displaces a small quantity of oil, but this does not represent any error, as the same procedure was followed in establishing the zero reading at the start of the test. The reading of the burette is taken and recorded, and the difference in volume, determined by calculation from the zero reading and the final reading, gives the net change in volume from test pressure to atmospheric pressure.

From the net change in volume, the known volume of the test chamber and the unit pressure of the test, the bulk modulus of the oil at the conditions of test pressure and temperature is determined by calculation.

When a large volume of oil is discharged into the measuring burette so that the burette is substantially filled, the oil can be removed from the burette by reducing the pressure of the pressure supply to atmospheric pressure and opening the valves 12 and 13. The oil level is lowered to the level of the adapter and the burette is removed, cleaned and replaced, as described above, for the next test. When the change in volume is such that the burette is only partially filled, the burette may serve for several test runs by re-subjecting the test chamber to pressure, i. e., opening valve 13 while valve 12 remains closed, and proceeding as described above with the final reading of the first test becoming the zero reading of the second test.

The burettes used should be selected to give readings of the desired accuracy, e. g., for liquids with a small bulk modulus, the bore may be relatively large, while with liquids with a large bulk modulus, the bore should be small, to give readings of comparable accuracy. In many cases, after preliminary tests are made to determine the extent of volume change for a particular liquid sample, we replace a burette of larger bore with a burette of smaller bore so that for a small change in volume the liquid is forced to greater height allowing increased accuracy in the determination of the net change in volume and, therefore, the calculated bulk modulus. In the lower pressure ranges, a small bore burette may be advantageously used even with liquids of small bulk modulus, because the volume changes, due to the low imposed pressures, will be small.

We claim:

1. An apparatus for use in the determination of the bulk modulus of a liquid which includes two cup-shaped elements fastened together to form a chamber, means for sealing the connection between the elements, an inlet line leading into said chamber, an outlet line leading out of said chamber, means for controlling the flow through the inlet line and the outlet line, means for supplying liquid under pressure to the chamber through the inlet line, and an open measuring vessel connected to the terminal of the outlet line.

2. An apparatus for use in the determination of the bulk modulus of a liquid which includes a base having a basin formed therein, a cap fastened to the base over said basin to form a chamber, means for sealing the connection between the base and the cap, an inlet line fastened to the cap and connecting with a hole through the cap to the chamber, means for controlling flow through the inlet line, an outlet line fastened to the cap and connecting with a hole through the cap from the chamber, means for controlling flow through the outlet line, an open measuring vessel connected to the terminal of the outlet line, and means for supplying liquid under pressure to the chamber through the inlet line.

3. An apparatus for use in the determination of the bulk modulus of a liquid which includes a base having a basin formed therein, a cap fastened to the base over said basin to form a chamber, means for sealing the connection between the base and the cap, a thermometer well extending through the cap and into the chamber, an inlet line fastened to the cap and connecting with a hole through the cap to the chamber, means for controlling flow through the inlet line, an outlet line fastened to the cap and connecting with a hole through the cap from the chamber, means for controlling flow through the outlet line, an open measuring vessel connected to the terminal of the outlet line, and means for supplying liquid under pressure through the inlet line.

4. An apparatus for use in the determination of the bulk modulus of a liquid which comprises a base having a basin formed therein, a cap fastened to the base over the basin to form a chamber, means for sealing the connection between the base and the cap, an inlet line fastened to the cap and connecting with a hole through the cap leading into the chamber, valve means in the inlet line to control flow into the chamber, an outlet line fastened to the cap and connecting with a hole through the cap leading out of the chamber, valve means in the outlet line to control flow out of the chamber, a hollow cylindrical adapter connected to the terminal of the outlet line, said adapter having an internal surface formed to fit the ground glass taper of interchangeable open volumetric burettes, a thermometer well extending into the chamber through the cap, means associated with the well for measuring the temperature within the chamber, and means for supplying liquid under pressure through the inlet line.

S. LOGAN KERR.
LEWIS H. KESSLER.

References Cited in the file of this patent

UNITED STATES PATENTS

| Number | Name | Date |
| --- | --- | --- |
| 2,539,843 | Kerr | Jan. 30, 1951 |